United States Patent
Dannenhauer et al.

(10) Patent No.: US 6,338,897 B1
(45) Date of Patent: Jan. 15, 2002

(54) PIGMENT WITH COLOR DEPENDANT ON VIEWING ANGLE, METHOD OF MAKING AND USE OF SAME

(75) Inventors: Fritz Dannenhauer, Hasel; Karl Holdik; Fritz Mezger, both of Ulm, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/406,089

(22) Filed: Sep. 24, 1999

Related U.S. Application Data

(62) Division of application No. 08/784,302, filed on Jan. 16, 1997, now Pat. No. 5,976,239, which is a continuation of application No. 08/592,715, filed on Jan. 26, 1996, now abandoned.

(30) Foreign Application Priority Data

Jan. 26, 1995 (DE) .......................... 195 02 413

(51) Int. Cl.⁷ .................................. B32B 9/04
(52) U.S. Cl. ..................... 428/323; 523/171; 524/269; 428/447
(58) Field of Search ................ 428/447, 323; 523/171; 524/269

(56) References Cited

U.S. PATENT DOCUMENTS

| | | | | |
|---|---|---|---|---|
| 4,388,453 A | * | 6/1983 | Finkelmann et al. | 252/299.01 |
| 4,637,896 A | * | 1/1987 | Shannon | 526/284 |
| 5,039,208 A | * | 8/1991 | Ohnishi et al. | 252/299.01 |
| 5,362,315 A | * | 11/1994 | Mueller-Rees et al. | 106/493 |
| 5,426,151 A | * | 6/1995 | Brandt et al. | 525/100 |

FOREIGN PATENT DOCUMENTS

| | | |
|---|---|---|
| DE | 4240743 | 6/1994 |
| DE | 44 18 075 | 11/1995 |
| WO | WO 95/29961 | 11/1995 |
| WO | WO 95/29962 | 11/1995 |

* cited by examiner

Primary Examiner—Blaine Copenheaver
Assistant Examiner—Christopher Paulraj
(74) Attorney, Agent, or Firm—Crowell & Moring LLP

(57) ABSTRACT

The invention relates to a pigment with color dependent on the viewing angle, which has been obtained by three-dimensional crosslinking of oriented substances of liquid-crystalline structure having a chiral phase. In order to stabilize the color of such a pigment at elevated temperatures, crosslinking is carried out in the presence of at least one additional, color-neutral compound comprising at least two crosslinkable double bonds.

1 Claim, No Drawings

PIGMENT WITH COLOR DEPENDANT ON VIEWING ANGLE, METHOD OF MAKING AND USE OF SAME

This application is a division of application Ser. No. 08/784,302, filed Jan. 16, 1997, now U.S. Pat. No. 5,976,239 which in turn is a continuation of application Ser. No. 08/592,715 filed Jan. 26, 1996 now abandoned.

BACKGROUND AND SUMMARY OF THE INVENTION

The present invention relates to a pigment wherein the color depends on the viewing angle, obtained by three dimensional crosslinking of oriented substances of liquid-crystalline structure having a chiral phase.

The present invention additionally relates to a process for the preparation of a pigment wherein the color depends on the viewing angle, in which oriented substances of liquid-crystalline structure having a chiral phase are three-dimensionally crosslinked.

The invention further relates to a crating material which comprises a resin binder and such a pigment and to a motor vehicle finished with such a coating material.

A pigment of this kind and its preparation and use in a coating material, in particular in a finish for motor vehicles, is known from Mueller-Rees et al., U.S. Pat. No. 5,362,315 (counterpart of German Patent DE 42 40 743), the entire disclosure of which is herein incorporated by reference.

Liquid-crystalline substances used for the preparation of such pigments have a twisted structure whose pitch corresponds to the wavelength of light in the region of UV to IR. This structure is found, for example, in cholesteric liquid crystals. Cholesteric liquid crystals or in general liquid-crystalline substances with a chiral phase and a twisted structure with a desired pitch can be obtained from nematic, smectic or discotic structures by adding a chiral substance to them. The nature and quantity of the chiral substance determine the pitch of the twisted structure and therefore the wavelength of the reflected light. The structure can be twisted either left-handed or right-handed. The starting substances, moreover, have groups which are available for polymerization, either by condensation polymerization or addition polymerization.

These substances become oriented, for example during application with a doc:or blade to a film. Subsequently, the substances are crosslinked, for example by irradiation with UV light. This gives rise to the pigment, which after detachment from the film, can be brought to the desired particle size.

These pigments can be incorporated into coating materials or coating systems, especially coating materials for the finishing of motor vehicles. A motor vehicle finished in this way exhibits a color, such as blue, green or red shades, which differs at a single point depending on the viewing angle.

In the practical use of such pigments in the finishing of motor vehicles, it has now been found that the color changes are dependant to a great extent on the baking or drying temperature of the coating material.

Although it is desirable that such color pigments should produce a color which differs depending on the viewing angle, it is not desirable for the shades which result from a specific viewing angle to be different depending on the baking or drying temperature or on the temperature treatments of the pigments. This is not only undesirable when using the pigments in coating materials, especially for motor vehicle finishes, but for all applications of the pigments in which they are subjected to heat treatments. For instance, another area in which such pigments can be used is the cosmetics industry, in which creams, pastes or the like are heated, for example, for sterilization. In these areas of application too, no temperature-dependent color shift should occur.

When the pigments are used in coating systems for finishing motor vehicles, the coating materials of the original finish of the bodywork are baked or dried at about 130° C. In subsequent refinishing operations, however, it is not possible to use such high temperatures, because other components of the motor vehicle can be damaged. Refinishing operations are therefore carried out at about 80° C. In practice, it has been found that these different baking or drying temperatures induce, in a single given pigment, severe shifts in color, especially blue shifts.

An object of the present invention is therefore to remedy this situation and to continue developing pigments in which the color from a particular viewing angle remains largely unaltered by the-action of elevated temperatures.

In the case of a pigment, the object is achieved according to the present invention by crosslinking in the presence of at least one color-neutral compound comprising at least two crosslinkable double bonds.

In the case of a process, the object is achieved by admixing the substances prior to crosslinking with at least one color-neutral compound comprising at least two crosslinkable double bonds.

By admixing crosslinkable compounds which comprise at least two double bonds it is possible to increase the crosslinking density of the pigments. At the same time a certain dilution of reactive components which constitute The color pigments is achieved, and these "reactive diluents" are integrated, in the course of crosslinking, into the resulting three-dimensional matrix.

Surprisingly it has been found that by diluting on the one hand and by increasing the crosslinking density on the other hand, the color of the resulting pigments per se is not altered, and at the same time, a high color stability at elevated temperatures is achieved, thus reducing the color shift.

"Color-neutral" compounds in the context of the present invention are those which do not exert any unwanted effect on the resulting color of the reactive substances of liquid-crystalline structure having a chiral phase, and whose functionality creates the possibility of additional crosslinking points.

In a preferred embodiment, the color-neutral compounds have more than three cross linkable double bonds. This increased functionality greatly increases the crosslinking densities of the pigments according to the invention and particularly contributes to color stability at elevated temperatures.

In a further preferred embodiment, the color-neutral compounds have double bonds of the acrylate, methacrylate, vinyl and/or allyl type.

These measures are advantageous in, that these types of double bonds are similar to those functional groups which provide for three-dimensional crosslinking the substances of liquid-crystalline structure having a chiral phase, so that the compounds which now have additionally been admixed can be crosslinked using the same initiators as the actual substances constituting the pigments. If, for example, the substances of the liquid-crystalline structure selected are those which can be crosslinked with UV light, then corresponding, UV-crosslinkable color neutral compounds can be added in order to achieve the desired color stability effect. Accordingly, this is done by mixing in the corresponding compounds prior to crosslinking, without needing to employ additional or different initiators.

In a further preferred embodiment, color-neutral compounds are selected from the group consisting of acrylates, polyurethanes, epoxides, siloxanes, polyesters and alkyd resins.

In a further preferred embodiment, at least one color-neutral compound is selected from the group consisting of 1,6-hexanediol diacrylate, divinylbenzene, trivinylalkoxysilanes, trifunctional polyurethane acrylate oligomers, mixtures of pentaerythritol tri- and tetraacrylates, tetrafunctional acrylate oligomers, tetraallylsilane, tetravinylsilane, tetrakis(2-methacryloyloxyalkoxy)silanes, 1,3,5,7-tetravinyltetraalkylcyclotetrasiloxanes, hexafunctional polyurethane acrylate oligomers and dipentaerythritol hexaacrylate.

In a further preferred embodiment, the content of the color-neutral compound is from 1 to 20% by weight, preferably from 5 to 15% by weight, based on the total weight of the overall mixture to be crosslinked.

The pigments can be incorporated into conventional coating systems, in which case the pigments are ground and, if desired, screened to a suitable particle size.

If a motor vehicle is finished with such a coating material or coating system, the color shift observed is greatly reduced relative to the corresponding pigments without additional color-neutral compounds, even in the case of large differences in baking or drying temperature. Thus, for example, the ΔE value of coating materials provided with color pigments of the type specified at the outset can be reduced by more than 70% if the colors of coated samples are compared at baking or drying temperatures of room temperature and 130° C. Correspondingly pronounced results are obtained if the colors of coated panels are compared at baking or drying temperatures of 80° C. and 130° C. Similar comments apply to the Δλ values.

It is understood that the features mentioned above and below can be employed not only in the combinations indicated but also individually or in different combinations within the scope of the present invention.

Other objects, advantages and novel features of the present invention will become apparent from the following detailed description of the invention.

DETAILED DESCRIPTION OF THE INVENTION

The invention is described in more detail below with reference to a number of selected examples.

A) Preparation of Liquid-crystal Mixtures

A polyorganosiloxane was prepared as described in Mueller-Rees et al., U.S. Pat. No. 5,362,315 (counterpart of German Patent DE 42 40 743), Example 1, A: Polyorganosiloxanes Containing Methacrylic Acid. The core of the siloxane oligomer consists of an Si—O eight-membered ring of which on average two Si atoms carry a methacrylic acid-containing side chain, each having a terminal double bond, while the two other Si atoms of the eight-membered ring are each linked to a benzoic acid cholesteryl ester radical.

To prepare a red liquid-crystal mixture, 80% by weight of the above-described polyorganosiloxane was mixed with 20% by weight of 4-ethylphenyl methacryloyloxybenzoate (a mixture of this kind is available from the Wacker Chemie as CC3767).

To prepare a blue liquid-crystal mixture, 70% by weight of the above-described polyorganosiloxane was mixed with 30% by weight of cholesteryl methacrylate (a mixture of this kind is available from Wacker Chemie as CC3939).

B) Preparation of Pigments, Coating Materials and Coated Samples

COMPARISON EXAMPLE 1

A mixture of red liquid crystal (CC3767) and blue liquid is crystal (3939) in a weight ratio of 60:40 was prepared. 4% by weight of photoinitiator Irgacure 907 (2-methyl-1-[4 (methylthio)-phenyl]-2-morpholino-1-propanone from Ciba Marienburg GmbH) was added to this mixture, and the components were thoroughly mixed. The liquid-crystal mixture was then knife-coated at 90° C. onto a plastic film and crosslinked at 80° C. by means of UV light. The crosslinked liquid crystal was separated from the film and ground.

After grinding, the liquid crystal was in the form of a pigment and was incorporated into a binder system available from the Herberts company (known as 58L 90057). The pigment was added in a proportion of 4% by weight, and the composition was thoroughly dispersed and then diluted 2:1 with Herberts MSB diluent.

The resulting coating material with the liquid crystalline pigments was applied by dipping black metal panels, which were subsequently additionally coated with a BASF 2-component clearcoat.

The coated panel samples were then dried for one hour, in each case at different drying temperatures, namely at room temperature, 80° C., 100° C. and 130° C.

Subsequently, the reflection maxima of each sample from 380 to 760 nm (measuring geometry 45° and 0°, respectively) was determined using a Byk Gardner "Color-view" calorimeter.

The difference (Δλ) of the maxima of the samples dried at room temperature and at 130° C., and the difference of the samples dried at 80° C. and 130° C., were determined.

In addition, the colorimeter was used to determine the corresponding ΔE values (CIE color difference) of these samples.

WORKING EXAMPLE 1

A mixture of red liquid crystal CC3767 and blue liquid crystal CC3939 was prepared as described above under Comparison Example 1 in a ratio of 60:40, and 4% by weight of photoinitiator Irgacure 907 was added.

An additional 5% by weight of a mixture of pentaerythritol tri- and tetraacrylate (sold by the UCB company as PETIA) and 5% by weight of a tetrafunctional acrylate oligomer (sold by the UCB company as EBECRYL 40) was added to the mixture, and thoroughly mixed. The mixture was then knife-coated as described above onto a film, processed to a coating material and applied to black panels which were dried correspondingly at room temperature, 80° C., 100° C. and 130° C. The corresponding Δλ and ΔE values of these samples were also determired.

COMPARISON EXAMPLE 2

A mixture of red liquid crystal CC3767 and blue liquid crystal CC3939 was prepared as described under Comparison Example 1, but in a ratio of 80:20. 4% by weight of photoinitiator Irgacure 907 was added to this mixture.

The subsequent procedure was the same as for Comparison Example 1, i.e. the Δλ and ΔE values of the samples to be compared (at room temperature and 130° C., and at 80° C. and 130° C.) were determined.

WORKING EXAMPLE 2

The 80:20 mixture of CC3767 and CC3939, with photo-initiator Irgacure 907, described under Comparison Example 2 was prepared.

An additional 5% by weight of a mixture of pentaerythritol tri- and tetraacrylate (sold by the UCB company as PETIA) and 5% by weight of a hexafunctional polyurethane acrylate oligomer (sold by the UCB company as EBECRYL 5129, with a molecular weight of 2000) was added to this mixture, and the components were thoroughly mixed. This mixture was processed as described under Working Example 1, and the ΔE and Δλ values of the samples to be compared were determined.

The results are compiled in the table below.

TABLE

|  | RT–130° C. | 80° C.–130° C. |
|---|---|---|
| Comparison Example 1 |  |  |
| ΔE | 15 | 10 |
| Δλ (nm) | 35 | 25 |
| Working Example 1 |  |  |
| ΔE | 8 | 5 |
| Δλ (nm) | 24 | 14 |
| Comparison Example 2 |  |  |
| ΔE | 11 | 5 |
| Δλ (nm) | 40 | 20 |
| Working Example 2 |  |  |
| ΔE | 3.5 | 2 |
| Δλ (nm) | 17 | 10 |

RT-130° C. = Difference between the measured value of a sample dried at room temperature and the measured value of a sample dried at 130° C.
80° C.–130° C. = Difference between the measured value of a sample dried at 80° C. and the measured value of a sample dried at 130° C.

It is evident from the TABLE that in the Working Examples containing additional crosslinking color-neutral compounds comprising at least two cross linkable double bonds, substantially lower ΔE and Δλ values were obtained compared to the Comparison Examples. In other words, these additions substantially increase the color stability of the pigments at elevated temperatures.

Furthermore, in comparing the results of Working Example 1 with those of Working Example 2, it is noted that lower ΔE and Δλ values were obtained when the functionality of the color-neutral compounds added was higher. From this it can be concluded that higher functionality brings about a greater reduction in color shift at elevated temperatures.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A motor vehicle finished with a coating material, said coating material comprising:

a resin binder; and a pigment having a color which depends upon viewing angle, the pigment comprising:
(A) at least one oriented color-producing substance having a liquid-crystalline structure with a chiral phase and at least one cross-linkable structure, wherein the at least one color-producing substance is integrated in a three-dimensional matrix via its at least one cross-linkable structure and exhibits therein a particular color when viewed at a particular angle, and
(B) at least one color-neutral substance having at least two cross-linkable double bonds, wherein the at least one color-neutral substance is further integrated in the three dimensional matrix via its at least two cross-linkable double bonds and increases the cross-link density of the three dimensional matrix without affecting the particular color exhibited by the at least one oriented color-producing substance, wherein said pigment is substantially the same color at room temperature and at 130° C.

* * * * *